(12) United States Patent
Urabe et al.

(10) Patent No.: US 9,875,522 B2
(45) Date of Patent: Jan. 23, 2018

(54) DISPLAY CONTROL APPARATUS

(71) Applicant: CANON KABUSHIKI KAISHA, Tokyo (JP)

(72) Inventors: Hirofumi Urabe, Tokyo (JP); Tadaaki Nishino, Machida (JP); Seiji Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/277,357

(22) Filed: Sep. 27, 2016

(65) Prior Publication Data

US 2017/0098295 A1 Apr. 6, 2017

(30) Foreign Application Priority Data

Oct. 5, 2015 (JP) .................................. 2015-197596

(51) Int. Cl.
G06T 17/00 (2006.01)
G06T 3/40 (2006.01)
G09G 3/00 (2006.01)

(52) U.S. Cl.
CPC ................ *G06T 3/40* (2013.01); *G09G 3/00* (2013.01); *G06T 2210/32* (2013.01); *G06T 2210/36* (2013.01)

(58) Field of Classification Search
None
See application file for complete search history.

(56) References Cited

U.S. PATENT DOCUMENTS

| 2010/0302130 | A1* | 12/2010 | Kikuchi | G06F 3/0481 345/1.3 |
| 2014/0320740 | A1* | 10/2014 | Wan | H04N 19/46 348/441 |
| 2015/0156424 | A1* | 6/2015 | Chen | H04N 5/265 348/588 |
| 2016/0212486 | A1* | 7/2016 | Liu | H04N 21/47202 |

FOREIGN PATENT DOCUMENTS

JP 2006-086866 A 3/2006
JP 2015-060021 A 3/2015

* cited by examiner

*Primary Examiner* — Frank Chen
(74) *Attorney, Agent, or Firm* — Fitzpatrick, Cella, Harper & Scinto

(57) ABSTRACT

A display control apparatus includes: a plurality of acquiring units; a determining unit configured to determine, as a display target, image data acquired by at least one of the acquiring units on the basis of an acquisition result of the plurality of acquiring units; and a setting unit configured to set a first display mode in a case where two or more image data are determined as the display targets, and to set a second display mode in a case where one image data is determined as the display target, wherein in a case where formats of a plurality of acquired image data are not the same, the determining unit determines one format based on the formats of the plurality of image data, and determines one or more image data having the determined one format as the display target.

25 Claims, 11 Drawing Sheets

DISPLAY CONTROL APPARATUS

BACKGROUND OF THE INVENTION

Field of the Invention

The present invention relates to a display control apparatus.

Description of the Related Art

An image display apparatus is available that can display an image having high resolution, such as with a number of horizontal effective pixels [3840]×a number of vertical effective lines [2160]. Hereafter "a number of horizontal effective pixels X×a number of vertical effective lines Y" is expressed as "X×Y". In image production fields that produce images for broadcasting, movies and the like, an image output apparatus may send a plurality of partial image data, which represent a plurality of partial images constituting a high resolution image, to an image display apparatus via a plurality of cables. Then the image display apparatus may simultaneously display the plurality of partial images represented by the plurality of partial image data. The image display apparatus displays the high resolution image by simultaneously displaying the plurality of partial images. For the cable, a serial digital interface (SDI) cable, for example, is used.

For example, an image display apparatus supporting a 3840×2160 resolution acquires four partial image data, each of which represents a partial image having a 1920×1080 resolution, from the image output apparatus via four cables. Then the image display apparatus simultaneously displays the four partial images, represented by the four partial image data, on four different screen regions. Thereby the image display apparatus displays an image having a 3840×2160 resolution.

There is another image display apparatus that has a display mode in which a plurality of partial images are simultaneously displayed on a plurality of screen regions (multi-display mode), and a display mode in which one selected partial image is displayed on the entire screen (single-display mode). In the above mentioned image production fields, images having various resolutions are produced. For example, in the above mentioned image production fields, an image having a 3840×2160 resolution (first production image) is produced, or an image having a 1920× 1080 resolution (second production image) is produced. To display the first production image, the image output apparatus generates a plurality of partial image data from first production image data (image data representing the first production image), and sends the plurality of partial image data to the image display apparatus via a plurality of cables. To display the second production image, the image output apparatus sends second production image data (image data representing the second production image) to the image display apparatus via one cable. Therefore it is preferable to set the multi-display mode to display the first production image, and to set the single-display mode to display the second production image.

Japanese Patent Application Laid-open No. 2006-086866 discloses a technique to select the single-display mode in a case where image data is acquired by only one of a plurality of input terminals, and to select a multi-display mode in a case where image data is acquired by all of the plurality of input terminals.

In some cases, however, all the cables may be constantly used to transmit image data from the image output apparatus to the image display apparatus. For example, to display the second production image, the image output apparatus may send second production image data to the image display apparatus via one cable, and send dummy image data to the image display apparatus via the rest of the cables. At least one of: color, brightness, frame rate, transmission format (e.g. interface format, progressive format), resolution and the like of the dummy image data is different from that of the second production image data. For example, the dummy image data represents an image with a single color (single color green).

According to the technique disclosed in Japanese Patent Application Laid-open No. 2006-086866, the multi-display mode is selected in a case where the second production image data is acquired by one input terminal, and dummy image data is acquired by the rest of the input terminals. As a result, the second production image is displayed in one of the plurality of screen regions, and a dummy image (image expressed by the dummy image data) is displayed in the rest of the screen regions. This type of image display is quite unsightly. In this way, with the technique disclosed in Japanese Patent Application Laid-Open No. 2006-086866, an inappropriate image (unsightly image) may be displayed.

Japanese Patent Application Laid-open No. 2015-060021 discloses a technique to select the multi-display mode or the single-display mode based on the resolution of the acquired image data. In concrete terms, the single-display mode is selected if two or more low resolution image data are acquired. However, according to the technique disclosed in Japanese Patent Application Laid-open No. 2015-060021, the multi-display mode is selected if the second production image data is acquired by one input terminal, and dummy image data having high resolution is acquired by the rest of the input terminals. Therefore, even with the technique disclosed in Japanese Patent Application Laid-open No. 2015-060021, an inappropriate image (unsightly image) may be displayed.

SUMMARY OF THE INVENTION

The present invention provides a technique to set a display mode such that an inappropriate image is not displayed.

The present invention in its first aspect provides a display control apparatus comprising:

a plurality of acquiring units each of which is configured to acquire image data;

a determining unit configured to determine, as a display target, image data acquired by at least one of the acquiring units on the basis of an acquisition result of the plurality of acquiring units; and a setting unit configured to set a first display mode, in which two or more images based on two or more image data acquired by two or more of the acquiring units are displayed side-by-side, in a case where the two or more image data are determined as the display targets, and to set a second display mode, in which one image based on one image data acquired by one of the acquiring units is displayed, in a case where the one image data is determined as the display target, wherein in a case where a plurality of image data are acquired and formats of the plurality of image data are not the same, the determining unit determines one format based on the formats of the plurality of image data, and determines one or more image data having the determined one format as the display target.

The present invention in its second aspect provides a display control method comprising:

a plurality of acquiring steps each in which image data is acquired;

a determining step of determining, as a display target, image data acquired by at least one of the acquiring steps on the basis of an acquisition result of the plurality of acquiring steps; and a setting step of setting a first display mode, in which two or more images based on two or more image data acquired by two or more of the acquiring steps are displayed side-by-side, in a case where the two or more image data are determined as the display targets, and of setting a second display mode, in which one image based on one image data acquired by one of the acquiring steps is displayed, in a case where the one image data is determined as the display target, wherein in a case where a plurality of image data are acquired and formats of the plurality of image data are not the same, in the determining step, one format is determined based on the formats of the plurality of image data, and one or more image data having the determined one format is/are determined as the display target.

The present invention in its third aspect provides a non-transitory computer readable medium that stores a program, wherein the program causes a computer to execute a plurality of acquiring steps each in which image data is acquired;

a determining step of determining, as a display target, image data acquired by at least one of the acquiring steps on the basis of an acquisition result of the plurality of acquiring steps; and a setting step of setting a first display mode, in which two or more images based on two or more image data acquired by two or more of the acquiring steps are displayed side-by-side, in a case where the two or more image data are determined as the display targets, and of setting a second display mode, in which one image based on one image data acquired by one of the acquiring steps is displayed, in a case where the one image data is determined as the display target, and in a case where a plurality of image data are acquired and formats of the plurality of image data are not the same, in the determining step, one format is determined based on the formats of the plurality of image data, and one or more image data having the determined one format is/are determined as the display target.

According to the present invention, a display mode can be set such that an inappropriate image is not displayed.

Further features of the present invention will become apparent from the following description of exemplary embodiments with reference to the attached drawings.

DESCRIPTION OF THE EMBODIMENTS

Example 1

Figure 1:
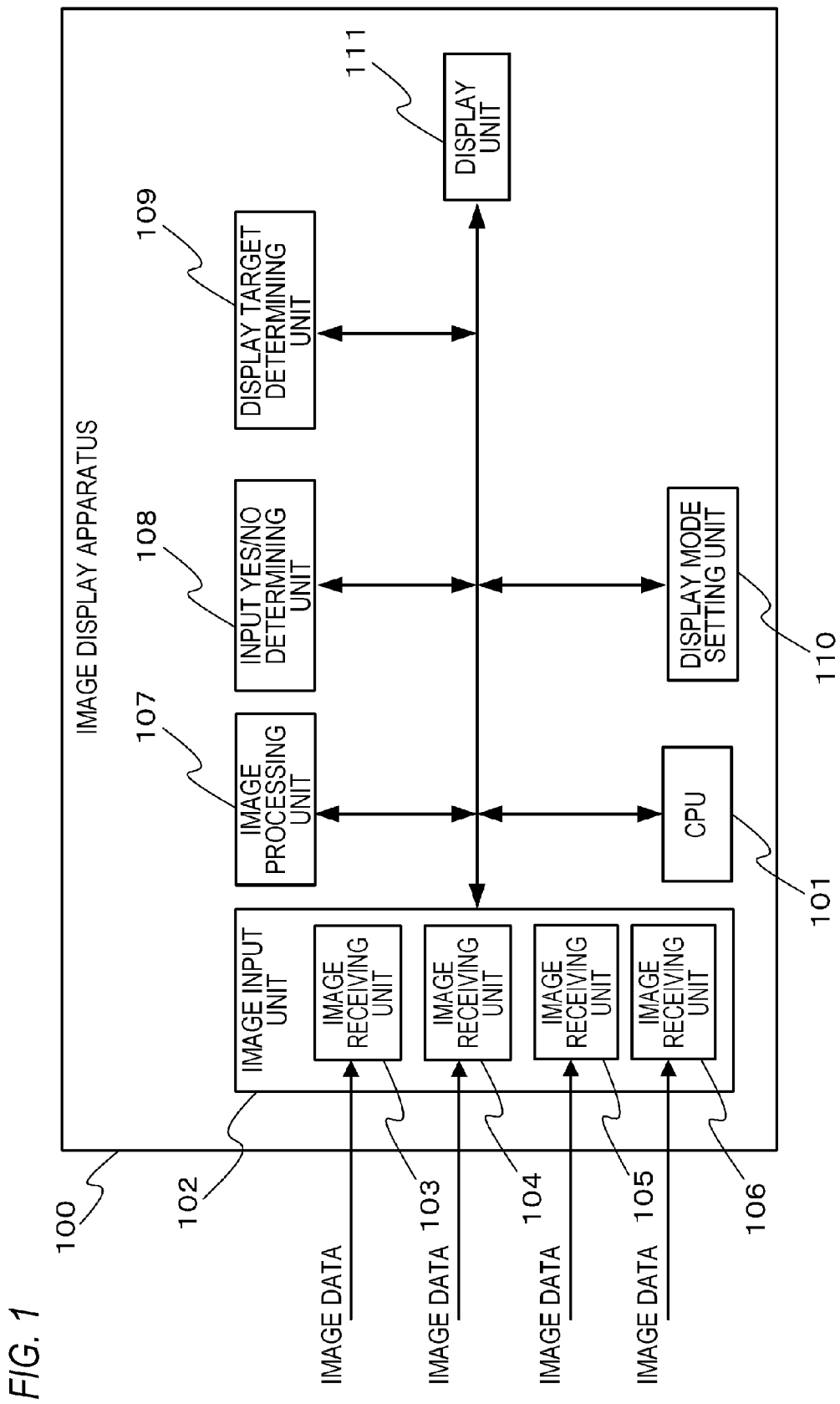
FIG. 1 is a block diagram depicting an example of a configuration of an image display apparatus according to Example 1.

Example 1 of the present invention will now be described. FIG. 1 is a block diagram depicting an example of a configuration of an image display apparatus 100 having a display control apparatus according to the present invention. The image display apparatus 100 automatically switches the display mode of the image display apparatus 100 based on a result of image data acquired from an outside source. There are two display modes: a multi-display mode (first display mode); and a single-display mode (second display mode). The multi-display mode is a display mode in which two or more images, based on two or more image data, are displayed side-by-side. The single-display mode is a display mode in which one image is displayed based on one image data.

In the following description, "a number of horizontal effective pixels X×a number of vertical effective lines Y" is expressed as "X×Y". An image having a 3840×2160 resolution is called a "4K image". And an image having a 1920×1080 resolution is called a "2K image". The resolution of an image processed by the image display apparatus 100 is not limited to 3840×2160 or 1920×1080.

A control unit (CPU) 101 controls the processing of each functional unit of the image display apparatus 100.

An image input unit 102 has a plurality of image receiving units. Each of the plurality of image receiving units acquires image data and individual format information, which is information regarding the format of this image data. The format includes at least one of: resolution (e.g. 1920×1080); frame rate (e.g. 60 Hz, 59.94 Hz); and transmission format (e.g. interlace format, progressing format, PsF format), for example. In this example, the image input unit 102 has four image receiving units, 103 to 106. Each of the image receiving units 103 to 106 is an SDI input terminal conforming to SDI standards. Each of the image receiving units 103 to 106 receives an SDI signal output from an image output apparatus (not illustrated), acquires image data and individual format information from the received SDI signal, and outputs the acquired image data and individual format information. The individual format information is stored in an ancillary region of the SDI signal, for example.

The standard of the image receiving unit is not limited to SDI standards. For example, as the image receiving unit, an HDMI input terminal conforming to HDMI standards may be used. The processing to acquire the image data (first acquiring processing) and the processing to acquire the individual format information may be performed by different functional units. The individual data and the individual format information may be separately input to the image display apparatus 100. The image format information need not always be acquired from an outside source. The format of image data may be directly detected from this image data by onboard processing of the image display apparatus 100. For example, the resolution of image data can be detected by counting a number of pixels of this image data. The number of the image receiving units may be more or less than four.

An input yes/no determining unit 108 determines, for each of the image receiving units 103 to 106, whether or not image data was input to the image receiving unit. In other words, it is determined whether or not the image receiving unit received the image data. The determination method is not limited. For example, if the individual format information indicates resolution, it can be determined whether or not image data was input based on the individual format information. In concrete terms, it can be determined that image data was input in a case where both a number of horizontal effective pixels and a number of vertical effective lines of the resolution, indicated by the individual format information, are not zero. And it can be determined that image data was not input in a case where at least one of a number of horizontal effective pixels and a number of vertical effective lines of the resolution indicated by the individual format information is zero. Then, the input yes/no determining unit 108 outputs this determination result.

Based on the reception result (acquisition result) of the image receiving units 103 to 106, a display target determining unit 109 determines the image data acquired by at least one of the image receiving units as the display target. In this example, the display target is determined based on the determination result of the input yes/no determining unit 108, the individual format information acquired by the image receiving units 103 to 106, and the presence/absence of payload information in the image data acquired by the image receiving units 103 to 106. The processing to determine the display target (display target determining processing) will be described later in detail.

A display mode setting unit 110 sets the display mode of the image display apparatus 100 based on the processing result of the display target determining unit 109. In concrete terms, if two or more image data acquired by two or more image receiving units are determined as the display targets, the display mode setting unit 110 sets the multi-display mode. If one image data acquired by one image receiving unit is determined as the display target, on the other hand, the display mode setting unit 110 sets the single-display mode.

The image processing unit 107 generates display image data from the image data acquired by the image receiving units 103 to 106, based on the display mode, which is set by the display mode setting unit 110, and the processing result of the display target determining unit 109. Then the image processing unit 107 outputs the display image data to a display unit 111. In this example, if the multi-display mode is set, image data, for displaying two or more display target images based on two or more image data side-by-side on the screen, is generated as the display image data. For example, image data, for displaying the above mentioned two or more images side-by-side on the entire screen or at the center of the screen, is generated as the display image data. If the single-display mode is set, the image data, for displaying one display target image based on the above mentioned one image data, is generated as the display image data. For example, image data, for displaying the above mentioned one image on the entire screen or at the center of the screen, is generated as the display image data.

The display unit 111 displays an image, generated based on the display image data output from the image processing unit 107, on the screen. For the display unit 111, a liquid crystal display panel, an organic EL display panel, a plasma display panel or the like can be used.

The processing by the image display apparatus according to this example may be implemented by a system constituted by a plurality of apparatuses. For example, the display control apparatus according to this example may be an apparatus that is separate from the image display apparatus. In this case, the display control apparatus may not include the display unit 111. The display unit 111 may include a plurality of partial display units. In this case, the screen of the display unit 111 is constituted by a plurality of screens (partial screens) of the plurality of partial display units. The plurality of partial display units may be a plurality of apparatuses which are separated from one another.

Figure 2:
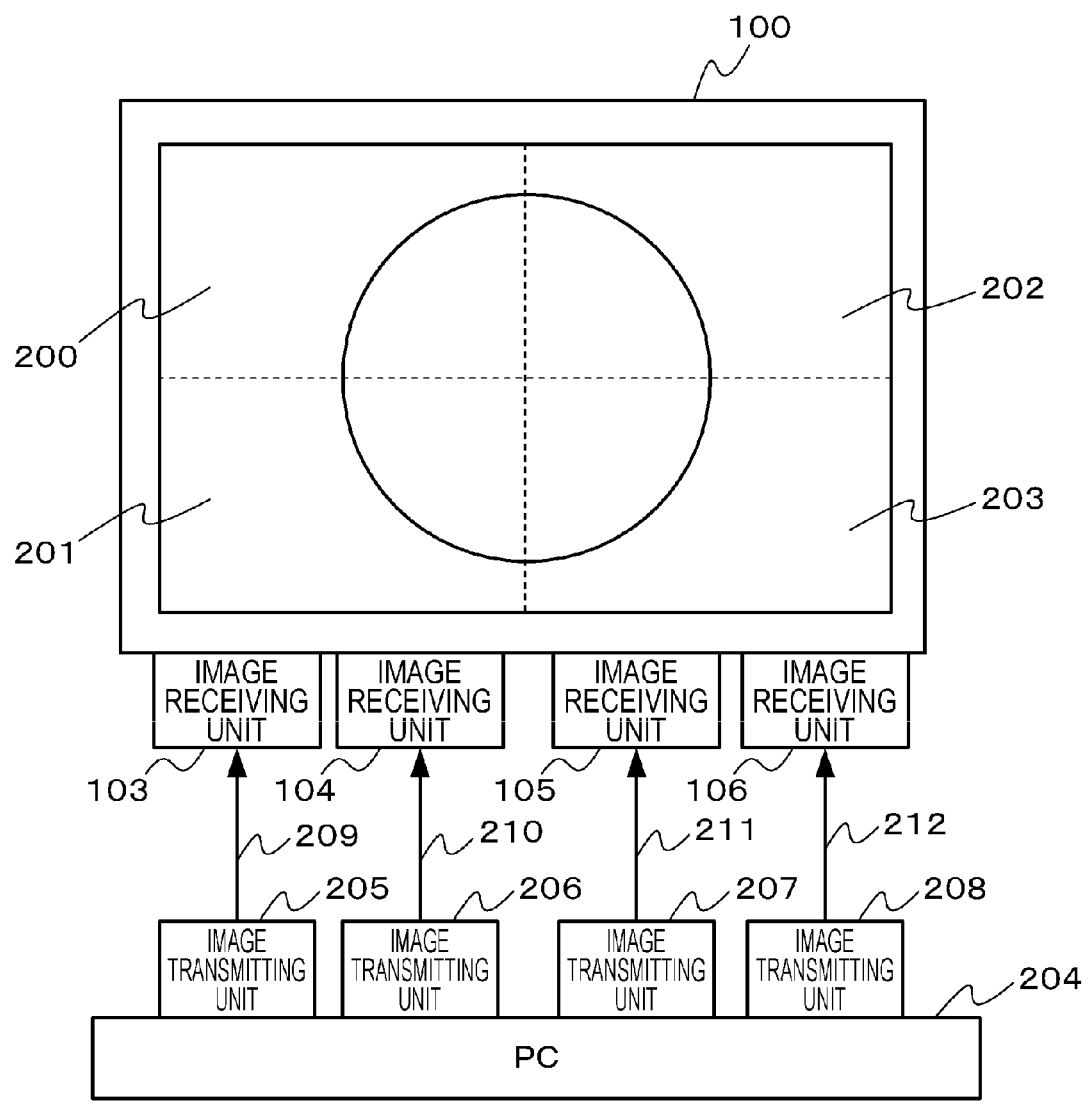
FIG. 2 is a diagram depicting a display example in a case where the multi-display mode is set.

FIG. 2 shows a display example in a case where the multi-display mode is set. Here an example in a case where image data, for displaying a 4K image (high resolution image), is transmitted/received between a personal computer (PC) 204, which is an image output apparatus, and the image display apparatus 100, will be described. It is assumed that the image display apparatus 100 can display a 4K image.

As shown in FIG. 2, the entire region of the screen of the image display apparatus 100 is constituted by four screen regions 200 to 203 arranged in 2 rows×2 columns. The image receiving units 103 to 106 and the screen regions 200 to 203 correspond one-to-one. In concrete terms, in a case where the multi-display mode is set, an image based on the image data acquired by the image receiving unit 103 is displayed on the screen region 200, and an image based on the image data acquired by the image receiving unit 104 is displayed on the screen region 201. An image based on the image data acquired by the image receiving unit 105 is displayed on the screen region 202, and an image based on the image data acquired by the image receiving unit 106 is displayed on the screen region 203.

As shown in FIG. 2, the PC 204 has four image transmitting units 205 to 208. Each of the image transmitting units 205 to 208 is an SDI output terminal conforming to SDI standards. The image transmitting unit 205 is connected to the image receiving unit 103 via an SDI cable 209, and the image transmitting unit 206 is connected to the image receiving unit 104 via an SDI cable 210. The image transmitting unit 207 is connected to the image receiving unit 105 via an SDI cable 211, and the image transmitting unit 208 is connected to the image receiving unit 106 via an SDI cable 212.

The PC 204 generates four 2K image data from 4K image data. The 4K image data is image data of a 4K image, and the 2K image data is an image data of a 2K image (low resolution image). The four 2K images based on the four 2K image data are four partial images in 2 rows×2 columns constituting the 4K image. Therefore each of the four 2K image data can be called "partial image data". The PC 204 outputs the partial image data of the first row and the first column from the image transmitting unit 205 to the image receiving unit 103 via the SDI cable 209, and outputs the partial image data of the second row and the first column from the image transmitting unit 206 to the image receiving unit 104 via the SDI cable 210. The PC 204 outputs the partial image data of the first row and the second column from the image transmitting unit 207 to the image receiving unit 105 via the SDI cable 211, and outputs the partial image data of the second row and the second column from the image transmitting unit 208 to the image receiving unit 106 via the SDI cable 212. Thereby the partial image in the first row and the first column is displayed on the screen region 200, the partial image in the second row and the first column is displayed on the screen region 201, the partial image in the first row and the second column is displayed on the screen region 202, and the partial image in the second row and the second column is displayed on the screen region 203. As a result, the complete 4K image is displayed on the entire screen of the image display apparatus 100.

Figure 3:
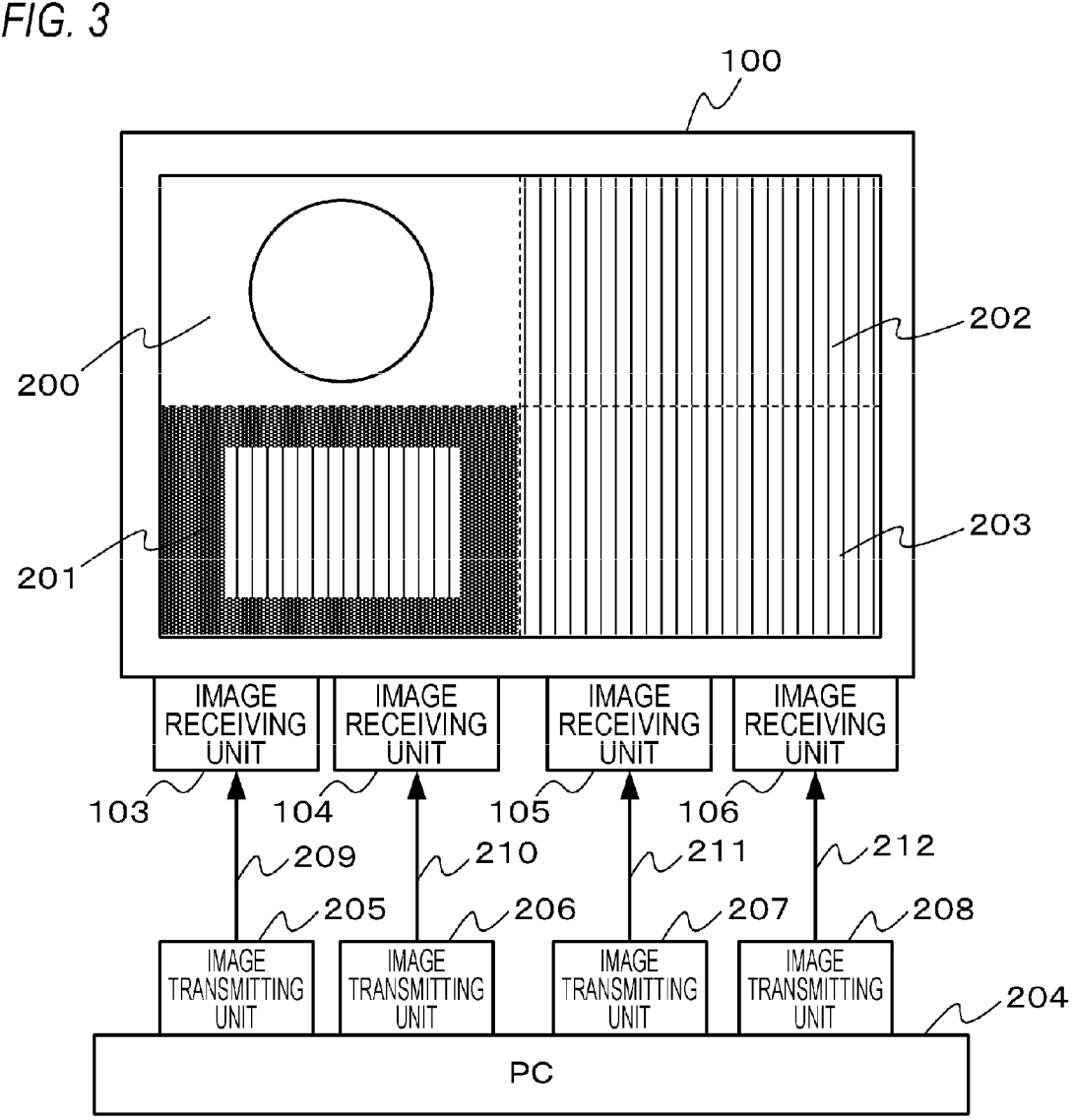
FIG. 3 is a diagram depicting a display example in a case where the multi-display mode is set.
Figure 4:
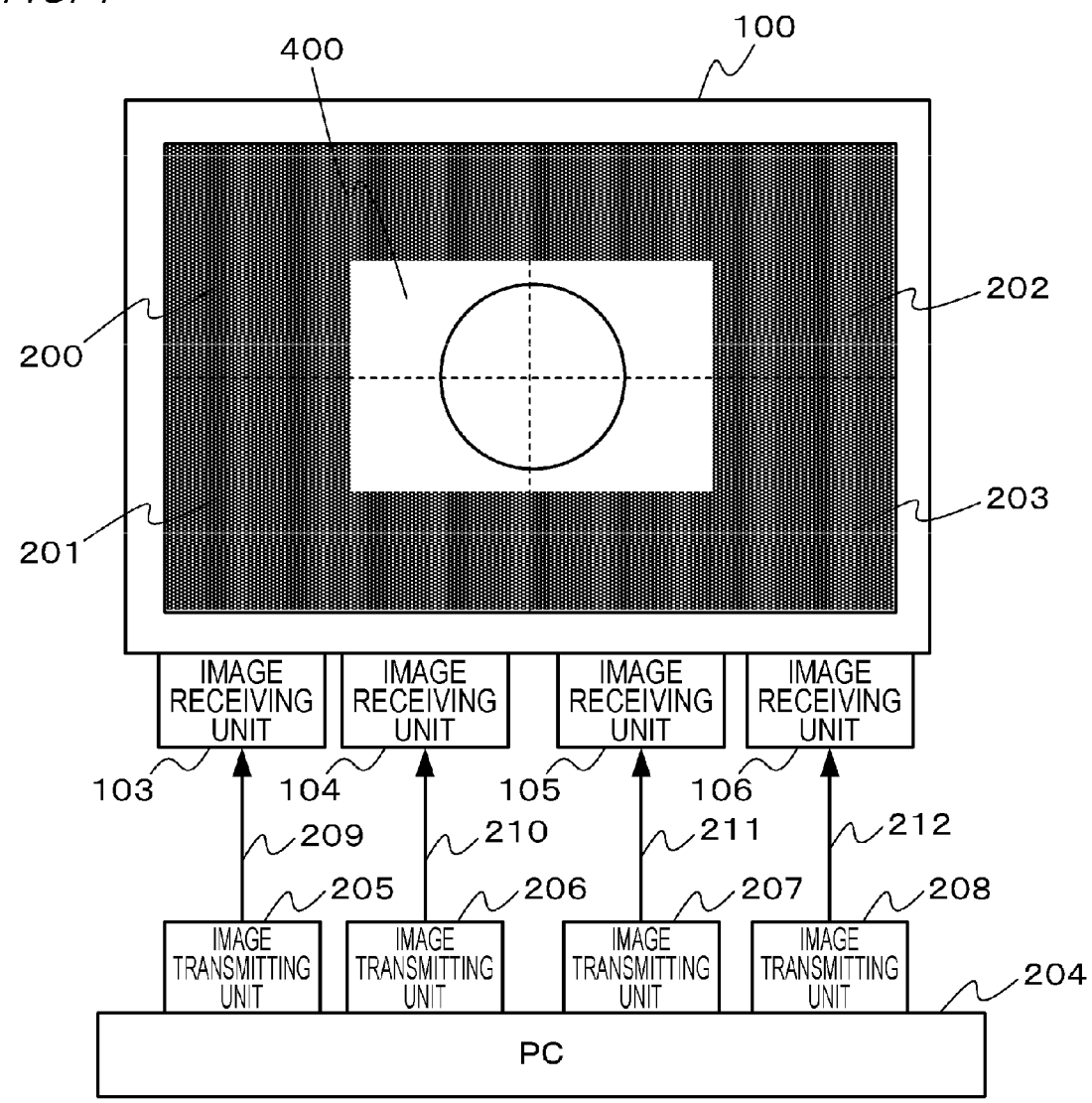
FIG. 4 is a diagram depicting a display example in a case where the single-display mode is set.

Here the image data for displaying a 2K image may be transmitted/received between the PC 204 and the image display apparatus 100. In this case, 2K image data, of which display is desired, is output from the image transmitting unit 205, and dummy image data is output from the image transmitting units 206 to 208. At least one of: color, brightness, frame rate, transmission format, resolution and the like of the dummy image data is different from that of the 2K image data of which display is desired. Therefore, if the multi-display mode is set, an image shown in FIG. 3 is displayed. As FIG. 3 shows, images of which display is not desired are displayed on the screen regions 201 to 203, and therefore an inappropriate image (unsightly image) is displayed. If the single-display mode is set, on the other hand, an image shown in FIG. 4 is displayed. As FIG. 4 shows, only the image of which display is desired is displayed at the center area 400 of the screen, and an appropriate image is displayed.

Figure 5:
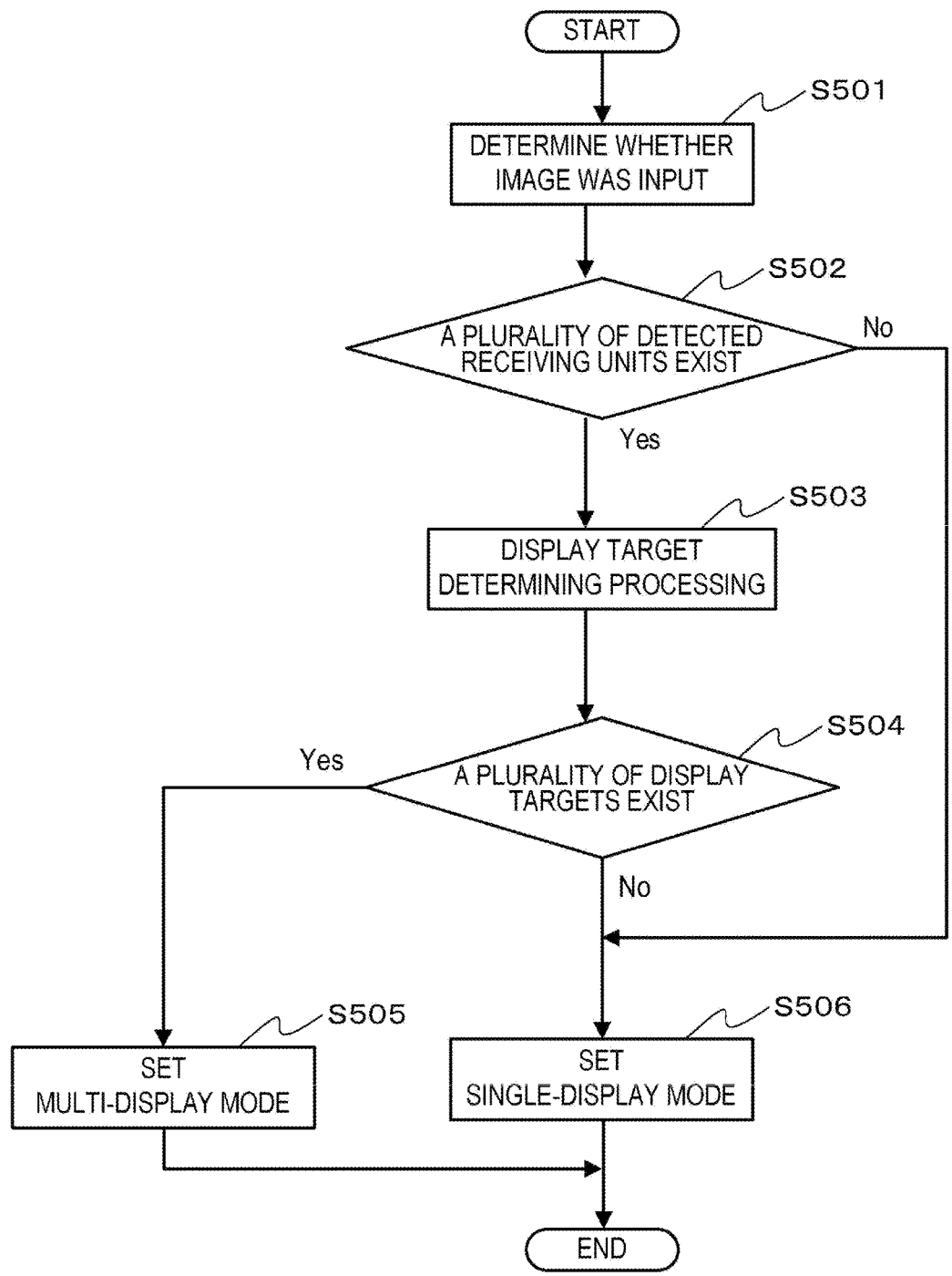
FIG. 5 is a flow chart depicting an example of a processing flow of an automatic setting processing according to Examples 1 and 2.

Therefore, in this example, the image display apparatus 100 performs the automatic setting processing shown in FIG. 5. By this, a display mode can be automatically set and switched so that such inappropriate images shown in FIG. 3 are not displayed. FIG. 5 is a flow chart depicting an example of the processing flow of the automatic setting processing according to this example.

First in S501, for each of the image receiving units 103 to 106, the input yes/no determining unit 108 determines whether or not image data was input to the image receiving unit. Then in S502, the display target determining unit 109 determines whether there are a plurality of detected receiving units, which are the image receiving units determined as "image data was input" in S501. In other words, it is determined whether or not a plurality of image data were acquired. If a plurality of detected receiving units exist, the processing advances to S503. If a number of detected receiving units is one, the display target determining unit 109 determines the image data acquired by the detected receiving unit as the display target, and the processing advances to S506. If the detected receiving unit does not exist, the display target determining unit 109 determines that no display target exists, and this processing flow ends (not illustrated).

In S503, the display target determining unit 109 determines the image data acquired by at least one of the plurality of detected receiving units as the display target. In S503, the display target is determined depending on the individual format information acquired by the plurality of detected receiving units, and whether or not payload information is added to the image data acquired by the plurality of detected receiving units. Then in S504, the display mode setting unit 110 determines whether a number of display targets determined in S503 is two or more. If the number of display targets is two or more, the processing advances to S505, and if the number of display targets is one, the processing advances to S506.

In S505, the display mode setting unit 110 sets the multi-display mode. The image processing unit 107 generates display image data from the two or more image data which were determined as the display targets in S503, and outputs the generated display image data to the display unit 111. Thereby the two images, generated based on the two or more image data which were determined as the display targets in S503, are displayed side-by-side on the screen.

In S506, the display mode setting unit 110 sets the single-display mode. The image processing unit 107 generates the display image data from the one image data which was determined as the display target in S503, and outputs the generated display image data to the display unit 111. Thereby, the one image, generated based on the one image data which was determined as the display target in S503, is displayed on the screen.

Figure 6:
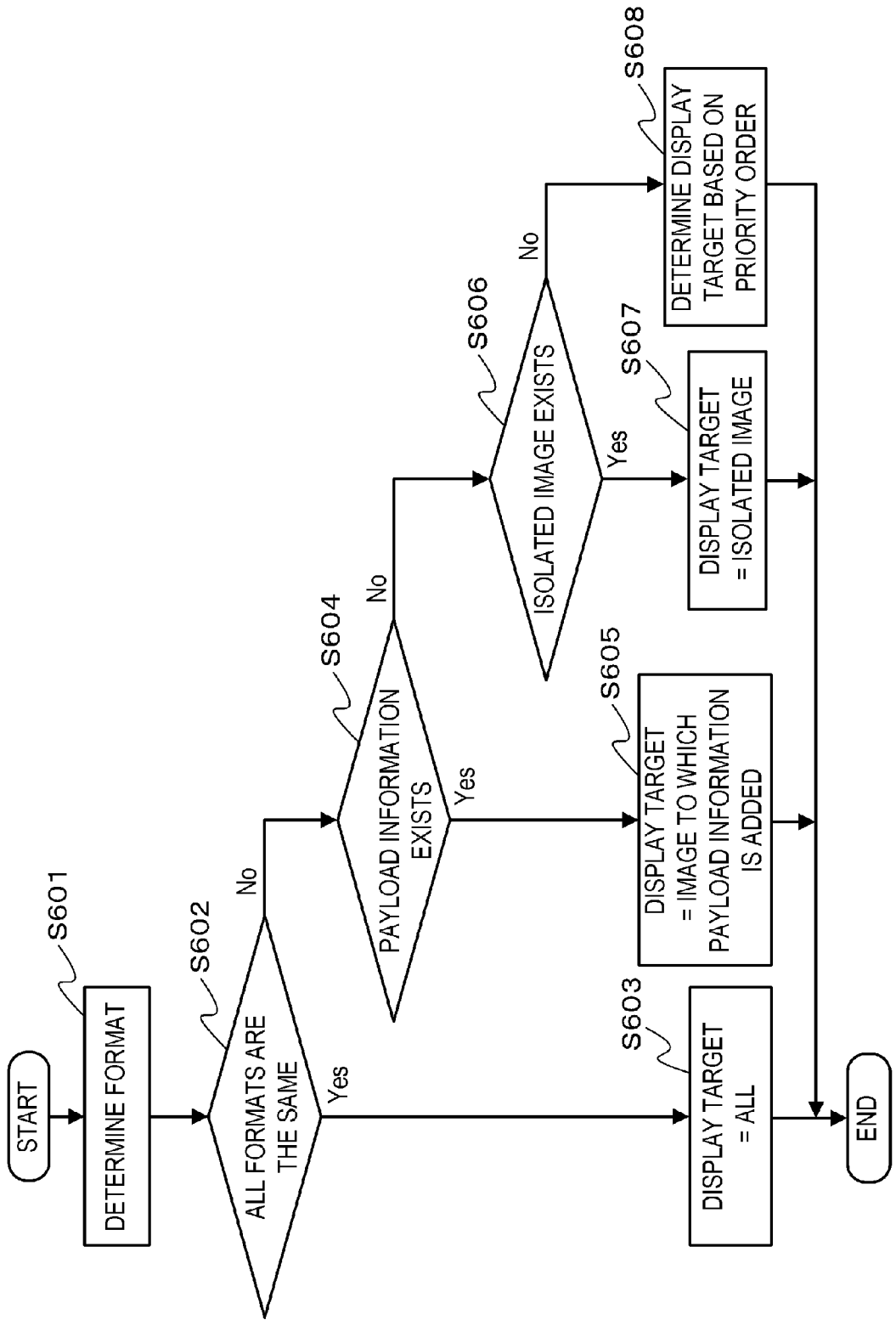
FIG. 6 is a flow chart depicting an example of a processing flow of a display target determination processing according to Example 1.

The display target determining processing (processing in S503 in FIG. 5) according to this example will be described in detail with reference to FIG. 6. FIG. 6 is a flow chart depicting an example of the processing flow of the display target determining processing according to this example.

First in S601, the display target determining unit 109 determines a format of each of a plurality of image data acquired by a plurality of detected receiving units, based on a plurality of individual format information acquired by the plurality of detected receiving units. The method for determining the format is not limited to the method of using the individual format information. The format may be determined based on the image data, as mentioned above.

Then in S602, the display target determining unit 109 determines whether or not the formats of the plurality of image data acquired by the plurality of detected receiving units are the same, based on the determination result in S601. If the formats of the plurality of image data are the same, the processing advances to S603, and if the formats of the plurality of image data acquired by the plurality of detected receiving units are not the same, the processing advances to S604. If the individual format information indicates a plurality of format types, it is determined whether or not the formats are the same for each type. If it is determined that the "formats are the same for all the types", the processing advances to S603, and if it is determined that the "formats are the same" for one or more types, the processing advances to S604.

In S603, the display target determining unit 109 determines all of the plurality of image data acquired by the plurality of detected receiving units as the display targets.

In S604, the display target determining unit 109 determines, for each of the plurality of image data acquired by the plurality of detected receiving units, whether or not payload information (predetermined information) is added to the image data. The predetermined information is not limited to the payload information. If image data to which the payload information is added exists, the processing advances to S605, and if image data to which the payload information is added does not exist, the processing advances to S606.

In S605, the display target determining unit 109 determines one image data to which the payload information is added as the display target. If there are a plurality of image data to which the payload information is added, one of the plurality of image data to which the payload information is added is determined as the display target based on the priority order of the image receiving units 103 to 106. The method for determining the display target based on the priority order will be described later. Further, the display target determining unit 109 also determines, as the display target, one or more image data having the same format as the format of the image data to which the payload information is added (display target), out of the plurality of image data acquired by the plurality of detected receiving units. Only one image data to which the payload information is added may be determined as the display target.

In S606, the display target determining unit 109 determines whether or not an isolated image data exists in the plurality of image data acquired by the plurality of detected receiving units. The isolated image data may exist in a case where three or more image data are acquired by three or more detected receiving units. In concrete terms, in a case where a format of one image data is different from the formats of the rest of the image data and the formats of the rest of the image data are the same, this one image data is detected as the isolated image data. If the isolated image data exists, the processing advances to S607, and if the isolated image data does not exist, the processing advances to S608.

In S607, the display target determining unit 109 determines the isolated image data as the display target.

In S608, the display target determining unit 109 determines one of the plurality of image data acquired by the plurality of detected receiving units as the display target, based on the priority order of the image receiving units 103 to 106. Here a case of priority order of the image receiving unit 103>priority order of the image receiving unit 104>priority order of the image receiving unit 105>priority order of the image receiving unit 106 is considered. If image data is acquired by the image receiving unit 103, the image data acquired by the image receiving unit 103 is determined as the display target. If the image data is not acquired by the image receiving unit 103 and the image data is acquired by the image receiving unit 104, the image data acquired by the image receiving unit 104 is determined as the display target. If the image data is not acquired by the image receiving units 103 and 104 and the image data is acquired by the image receiving unit 105, the image data acquired by the image receiving unit 105 is determined as the display target. Further, the display target determining unit 109 also determines, as the display target, one or more image data having the same format as the format of one image data determined as the display target based on the priority order.

In S608, all of the plurality of image data acquired by the plurality of detected receiving units may be determined as the display targets. One image data having a format different from the formats of all the rest of the image data may be determined as the display target. The priority order (priority level) may be a sequence (value) predetermined by the manufacturer, or may be a sequence (value) that the user can change. Other image data having the same format as the format of one image data, determined as the display target based on the priority order, need not be determined as the display target.

Concrete examples of the display target determining processing will be described with reference to FIGS. 7A to 7F. In FIGS. 7A to 7F, the left sides show images based on each image data acquired by the image receiving units 103 to 106, and the right sides show images displayed on the screen. In FIGS. 7A to 7F, the image 701 is an image based on the image data acquired by the image receiving unit 103, and the image 702 is an image based on the image data acquired by the image receiving unit 104. The image 703 is an image based on the image data acquired by the image receiving unit 105, and the image 704 is an image based on the image data acquired by the image receiving unit 106. The numbers written in the images 701 to 704 indicate the format of each image data. For example, "1920×1080" indicate that the resolution is 1920×1080. "24p" indicates that the frame rate (frame frequency) is 24 Hz, and the transmission format is a progressive format. "60i" indicates that the frame rate is 60 Hz, and the transmission format is an interlace format. "Payload" written in the image indicates that the payload information is added to the image.

Figure 7A:
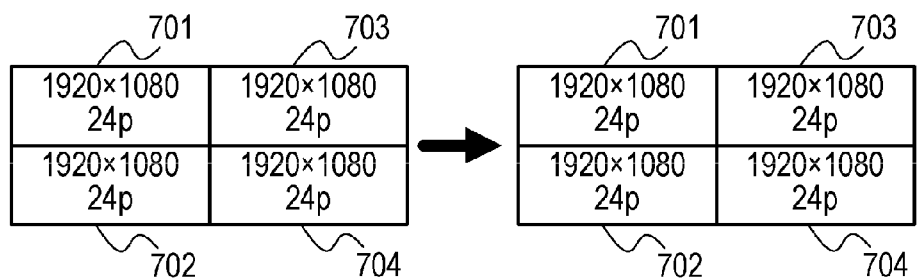
FIGS. 7A to 7F show concrete examples of the display target determination processing according to Example 1.

In FIG. 7A, the formats of the images 701 to 704 are all "1920×1080, 24p". Therefore, by the processing in S603, all of the images 701 and 704 are determined as the display targets.

Figure 7B:
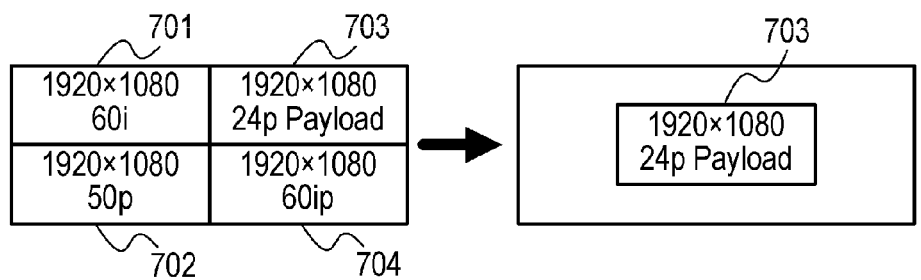

In FIG. 7B, the formats of the images 701 to 704 are not the same. The payload information is added to the image 703, and the format of the image 703 is different from the formats of images 701, 702 and 704. Therefore, by the processing in S605, only the image 703 is determined as the display target. In the example of FIG. 7B, the image 703 is displayed at the center of the screen.

Figure 7C:
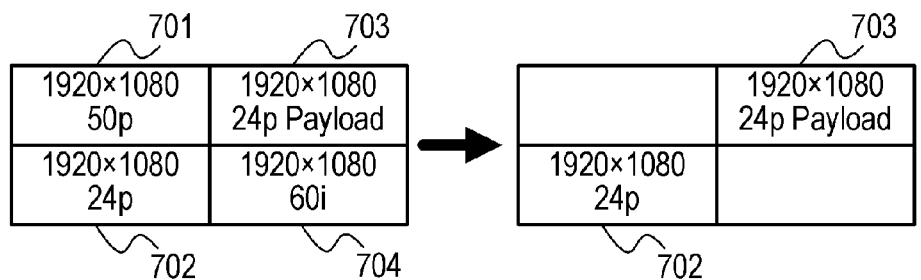

In FIG. 7C, the formats of the images 701 to 704 are not the same. The payload information is added to the image 703, the format of the image 703 is the same as the format of the image 702, and is different from the formats of the images 701 and 704. Therefore, by the processing in S605, only the images 702 and 703 are determined as the display targets. In the example in FIG. 7C, the image 702 is displayed in the screen region 201 (FIG. 2), and the image 703 is displayed in the screen region 202.

Figure 7D:
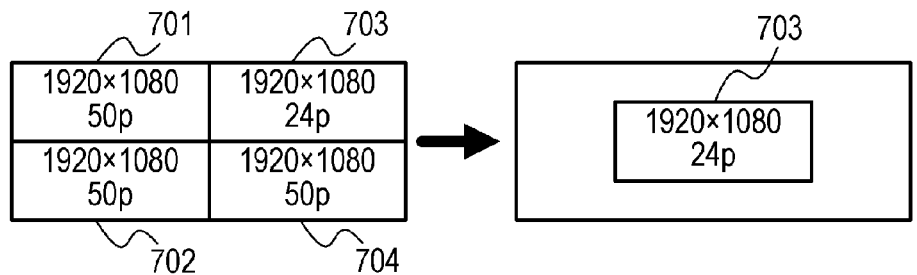

In FIG. 7D, the formats of the images 701 to 704 are not the same, and there is no image to which the payload information is added. The format of the image 703 is "1920×1080, 24p", and the formats of the images 701, 702 and 704 are "1920×1080, 50p". In other words, the image 703 is an isolated image (image based on the isolated image data). Therefore, by the processing in S607, only the image 703 is determined as the display target.

Figure 7E:
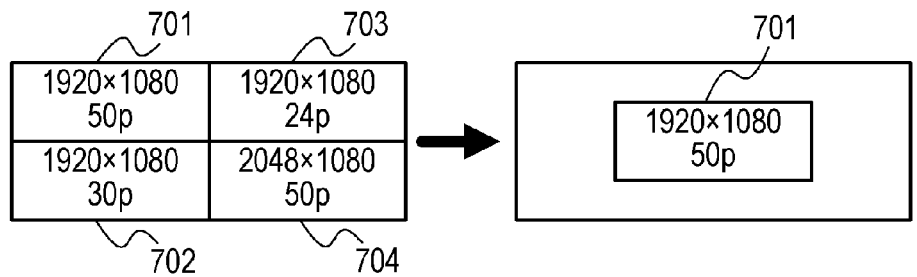

In FIG. 7E, the formats of the images 701 to 704 are not the same, and there is no image to which the payload information is added. The format of the image 701 is "1920×1080, 50p", and the format of the image 702 is "1920×1080, 30p". The format of the image 703 is "1920×1080, 24p", and the format of the image 704 is "2048×1080, 50p". In other words, there is no isolated image. Therefore, by the processing in S608, the image 701 is determined as the display target based on the priority order. Since there is no image that has the same format as the format of the image 701, only the image 701 is determined as the display target.

Figure 7F:
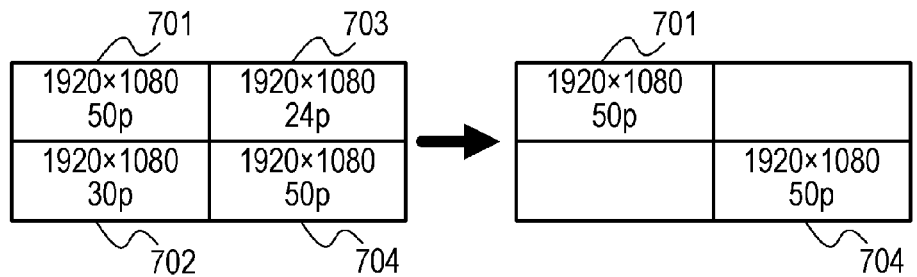

In FIG. 7F, the formats of the images 701 to 704 are not the same, and there is no image to which the payload information is added. The formats of the images 701 and 704 are "1920×1080, 50p", the format of the image 702 is "1920×1080, 30p", and the format of the image 703 is "1920×1080, 24p". In other words, there is no isolated image. Therefore, by the processing in S608, the image 701 is determined as the display target based on the priority order. The image 704 has the same format as the format of the image 701, and the images 702 and 703 have different formats from the format of the image 701. Therefore only the images 701 and 704 are determined as the display targets.

As described above, according to this example, in a case where the formats of a plurality of acquired image data are not the same, one format is determined based on the formats of the plurality of image data, and one or more image data having this one format determined here is/are determined as the display target. If two or more image data are determined as the display targets, the multi-display mode is set, and if one image data is determined as the display target, the single mode is set. Thereby a display mode can be set such that an inappropriate image (unsightly image) is not displayed.

Figure 8:
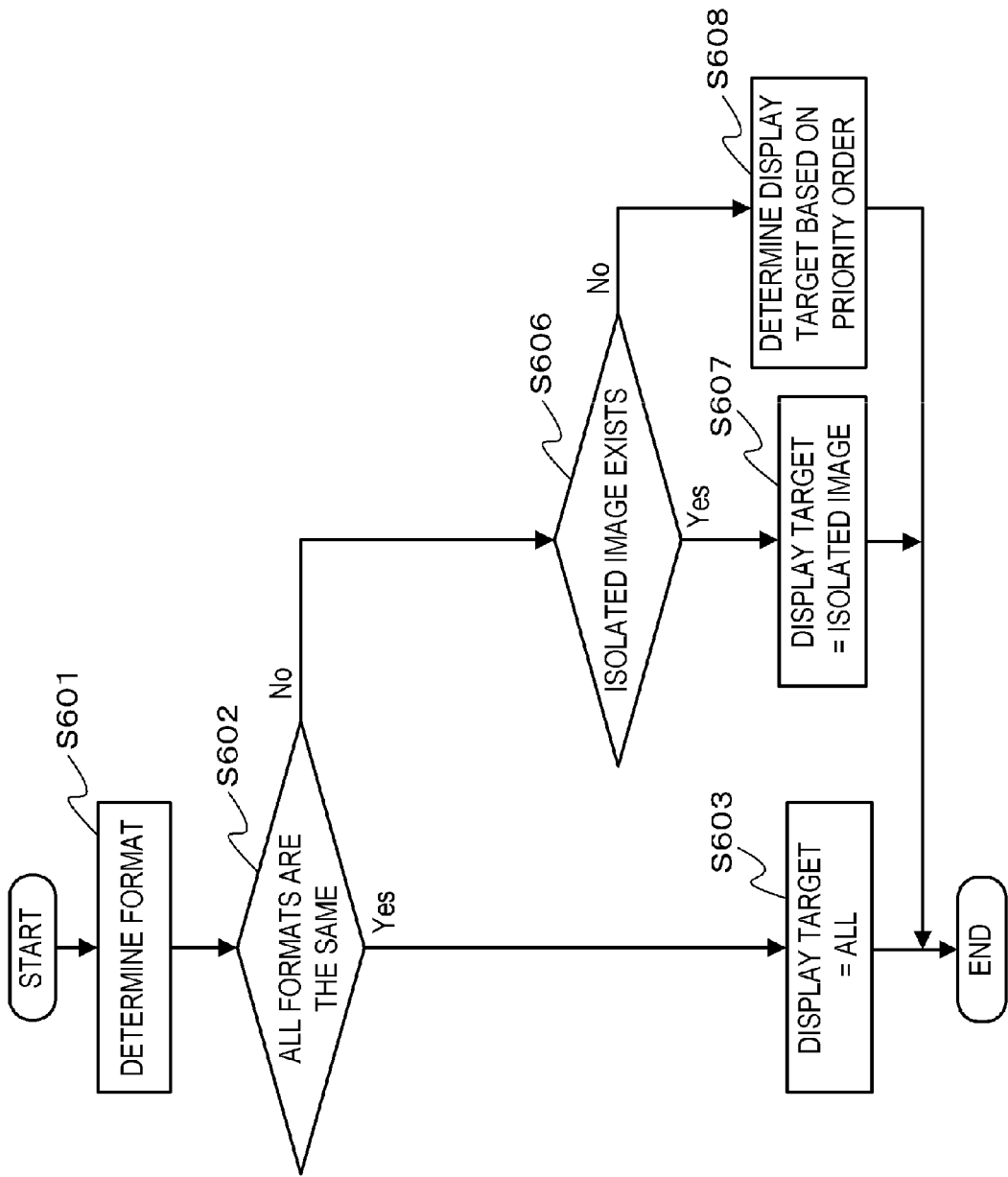
FIG. 8 is a flow chart depicting an example of a processing flow of the display target determination processing according to Example 1.

The display target determining processing is not limited to the above processing (FIG. 6). It is sufficient that if the formats of a plurality of acquired image data are not the same, one format may be determined based on the formats of the plurality of image data, and one or more image data having this one format determined here is/are determined as the display target. For example, as shown in FIG. 8, if the formats of a plurality of acquired image data are not the same, processing may advance from S602 to S606. In FIG. 8, the same processing as FIG. 6 is denoted with the same reference sign.

Example 2

Figure 9:
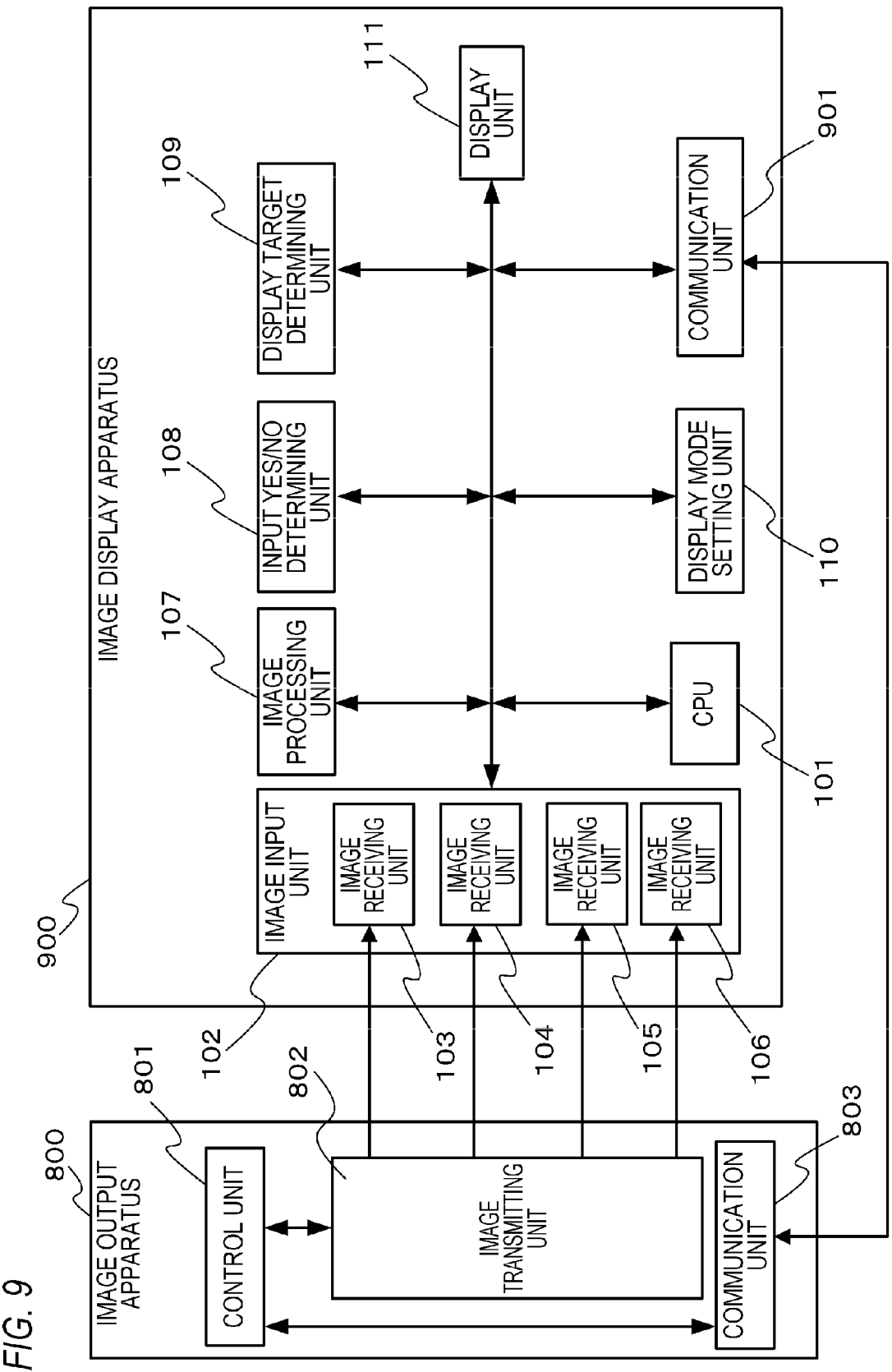
FIG. 9 is a block diagram depicting an example of a configuration of an image display system according to Example 2.

Example 2 of the present invention will now be described. In what follows, the description of the configuration and processing which are the same as Example 1 will be omitted. FIG. 9 is a block diagram depicting an example of a configuration of an image display system according to Example 2 of the present invention. As shown in FIG. 9, the image display system according to this example has an image output apparatus 800 and an image display apparatus 900. In FIG. 9, a functional unit the same as in Example 1 (FIG. 1) is denoted with the same reference sign as in Example 1.

The image output apparatus 800 has a control unit 801, an image transmitting unit 802 and a communication unit 803. The control unit (CPU) 801 controls the processing of each functional unit of the image output apparatus 800. In this example, in a case where producing images, the control unit 801 generates image data having various formats in the image production, and outputs the generated image data to the image transmitting unit 802. Further, the control unit 801 notifies the communication unit 803 of the format of the image data output to the image transmitting unit 802.

The image transmitting unit 802 outputs the image data for displaying the image based on the image data output from the control unit 801. In this example, the image transmitting unit 802 has four SDI output terminals. If the image data output from the control unit 801 has a format that cannot be transmitted by one SDI cable (e.g. 3840×2160 resolution), the image transmitting unit 802 generates four partial image data from the image data output from the control unit 801. The image transmitting unit 802 outputs the four partial image data (SDI signals including the partial image data) from the four SDI output terminals. If the image data output from the control unit 801 has a format that can be transmitted by one SDI cable (e.g. 1920×1080 resolution), the image transmitting unit 802 outputs the image data output from the control unit 801 via one SDI output terminal. Then the image transmitting unit 802 outputs dummy image data via the remaining three output terminals. Further, in this example, the image transmitting unit 802 also outputs the individual format information. For the image transmitting unit 802, a graphic card can be used, for example.

The above mentioned processing of the image transmitting unit 802 is automatically per formed by onboard processing of the image transmitting unit 802. Therefore the control unit 801 cannot determine which SDI output terminal was used to output what image data. The individual format information need not be output from the image transmitting unit 802. And the dummy image data need not be output from the image transmitting unit 802.

The communication unit 803 communicates with an external apparatus. In this example, the communication unit 803 outputs information regarding the format notified by the image output apparatus 800 (display format information) to the image display apparatus 900. The communication unit 803 has a communication I/F, such as Ethernet®. The communication by the communication unit 803 may be via cable or radio.

The image display apparatus 900 has a plurality of functional units employed in the image display apparatus 100 of Example 1, and a communication unit 901. The communication unit 901 communicates with an external apparatus. In this example, the communication unit 901 acquires format information, which is information regarding the format of the image data (second acquiring processing). In concrete terms, the communication unit 901 acquires the display format information from the image output apparatus 800. Then the communication unit 901 outputs the acquired display format information to the display target determining unit 109. The communication unit 901 has a communication I/F, such as Ethernet®. The communication by the communication unit 901 may be via cable or radio.

Figure 10:
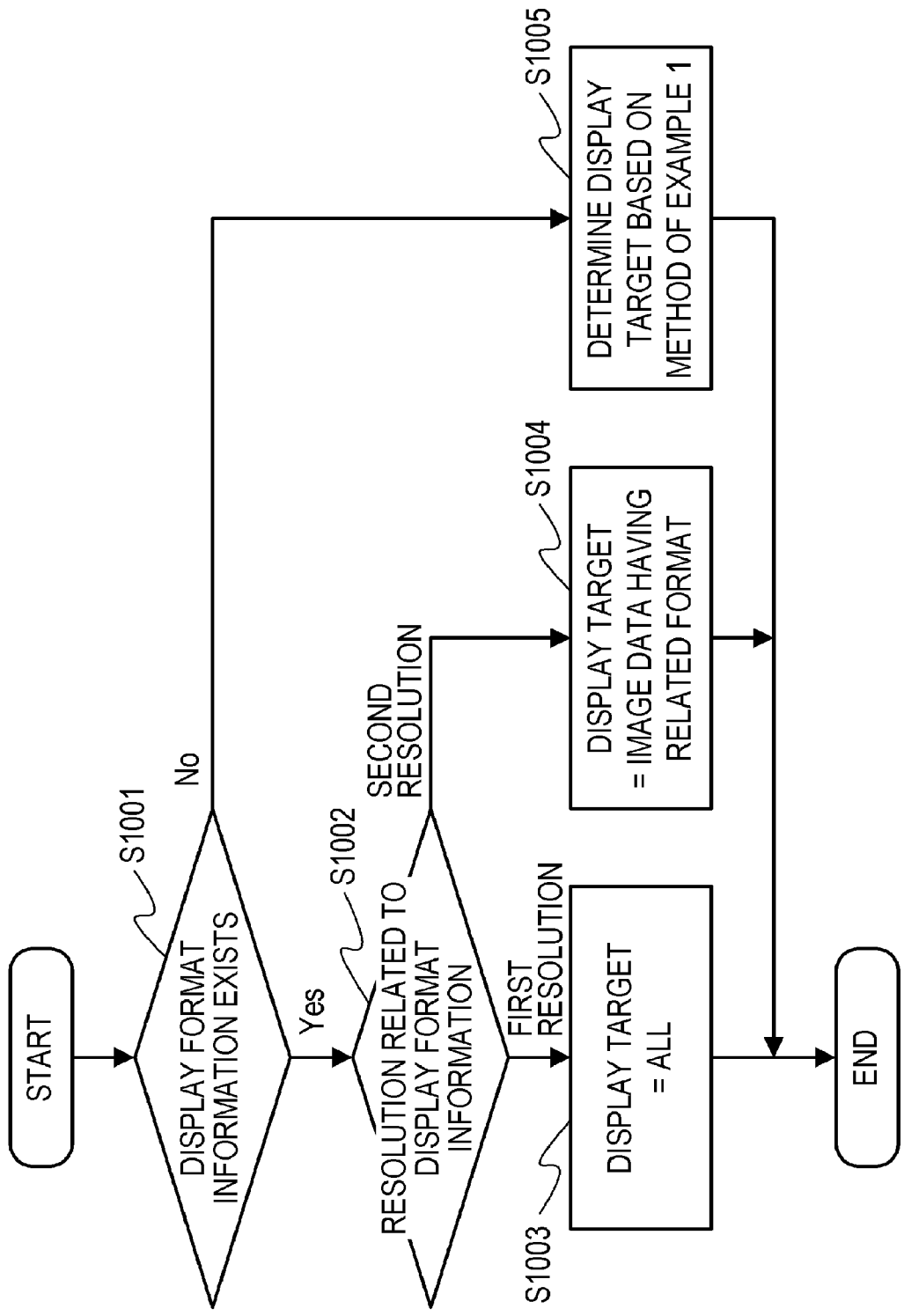
FIG. 10 is a flow chart depicting an example of a processing flow of a display target determination processing according to Example 2.

The display target determining processing according to this example (processing of S503 in FIG. 5) will be described in detail with reference to FIG. 10. FIG. 10 is a flow chart depicting an example of the processing flow of the display target determining processing according to this example.

First in S1001, the display target determining unit 109 determines whether or not the format information (display format information) was acquired by the communication unit 901. If the display format information was not acquired, the processing advances to S1005. In S1005, the display target is determined by the same method as Example 1 (FIG. 6). If the display format information was acquired, the processing advances to S1002. In S1002 to S1004, the display target is determined based on the acquired display format information.

The processing in S1005 is not limited to the processing to determine the display target by the same method as Example 1. For the processing in S1005, a processing the same as S603 in FIG. 6, or a processing the same as S611 in FIG. 6 may be performed. As long as the display target is determined based on the display format information, any method may be used for the processing method in S1002 to S1004.

In S1002, the display target determining unit 109 determines whether the acquired display format information is the format information regarding the first resolution or the format information regarding the second resolution. For example, the first resolution is 3840×2160, and the second resolution is 1920×1080. If the acquired display format information is the format information regarding the first resolution, the processing advances to S1003, and if the acquired display format information is the format information regarding the second resolution, the processing advances to S1004.

The first resolution and the second resolution are not especially limited. As long as the second resolution is lower than the first resolution, the first resolution and the second resolution can be any resolution. For example, all resolutions not less than a predetermined threshold may be used for the first resolution, and all resolutions less than a predetermined threshold may be used for the second resolution. In this case, the processing in S1002 can be regarded as a "processing to determine whether or not the resolution related to the acquired display format information is a predetermined threshold or more".

In S1003, the display target determining unit 109 determines, as the display targets, all the plurality of image data acquired by the plurality of detected receiving units.

In S1004, the display target determining unit 109 determines, as the display target, one or more image data having the same format as the format related to the acquired display format information (related format), out of the plurality of image data acquired by the plurality of detected receiving units.

As described above, according to this example, if the display format information regarding the format of the image data to be displayed is acquired, the display target is determined based on the acquired display format information. Thereby, display of an inappropriate image (unsightly image) can be controlled at high precision.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-197596, filed on Oct. 5, 2015, which is hereby incorporated by reference herein in its entirety.

What is claimed is:

1. A display control apparatus comprising:
a plurality of receivers each of which is configured to acquire image data;
at least one processor; and
at least one memory storing a program which, when executed by the at least one processor, causes the display control apparatus to:
determine, as a display target, image data acquired by at least one of the receivers on the basis of an acquisition result by the plurality of receivers; and
set a first display mode, in which two or more images based on two or more image data acquired by two or more of the receivers are displayed together, in a case where the two or more image data are determined as the display targets, and set a second display mode, in which one image based on one image data acquired by one of the receivers is displayed, in a case where the one image data is determined as the display target,
wherein in a case where a plurality of image data are acquired and formats of the plurality of image data are not the same, one format is determined based on the formats of the plurality of image data, and one or more image data having the determined one format are determined as the display target.

2. The display control apparatus according to claim 1, wherein
in a case where a plurality of image data are acquired and the formats of the plurality of image data are the same, the plurality of image data are determined as the display targets.

3. The display control apparatus according to claim 1, wherein
in a case where three or more image data are acquired, a format of one image data, out of the three or more image data, is different from the formats of all the rest of the image data of the three or more image data, and the formats of all the rest of the image data are the same, the one image data is determined as the display target.

4. The display control apparatus according to claim 1, wherein
in a case where a plurality of image data are acquired, formats of the plurality of image data are not the same, and an image data to which predetermined information is added is included in the plurality of image data, the one image data to which the predetermined information is added is determined as the display target.

5. The display control apparatus according to claim 4, wherein
the predetermined information is payload information.

6. The display control apparatus according to claim 1, wherein
in a case where a plurality of image data are acquired, formats of the plurality of image data are not the same, and an image data to which predetermined information is added and an image data having the same format as the format of the image data to which the predetermined information is added are included in the plurality of image data, the one image data to which the predetermined information is added and one or more image data having the same format as the format of the one image data to which the predetermined information is added are determined as the display targets.

7. The display control apparatus according to claim 1, wherein the display control apparatus acquires format information, which is information regarding a format of an image data, and wherein
in a case where a plurality of image data are acquired and the format information is acquired, the display target is determined on the basis of the format information.

8. The display control apparatus according to claim 7, wherein
in a case where a plurality of image data are acquired and format information regarding a first resolution is acquired, the plurality of image data are determined as the display targets, and
wherein in a case where a plurality of image data are acquired and format information regarding a second resolution, which is lower than the first resolution, is acquired, one or more image data having the same format as the format related to the format information, out of the plurality of image data, are determined as the display target.

9. The display control apparatus according to claim 1, wherein
the format includes at least one of: resolution, a frame rate and a transmission format.

10. A display control method comprising:
a plurality of acquiring steps each in which image data is acquired;
a determining step of determining, as a display target, image data acquired by at least one of the acquiring steps on the basis of an acquisition result by the plurality of acquiring steps; and
a setting step of setting a first display mode, in which two or more images based on two or more image data acquired by two or more of the acquiring steps are displayed together, in a case where the two or more image data are determined as the display targets, and of setting a second display mode, in which one image based on one image data acquired by one of the acquiring steps is displayed, in a case where the one image data is determined as the display target, wherein
in a case where a plurality of image data are acquired and formats of the plurality of image data are not the same one format is determined, in the determining step, based on the formats of the plurality of image data, and one or more image data having the determined one format are determined as the display target.

11. A non-transitory computer readable medium that stores a program, wherein
the program causes a computer to execute steps comprising:
a plurality of first acquiring steps each in which image data is acquired;
a determining step of determining, as a display target, image data acquired by at least one of the first acquiring steps on the basis of an acquisition result by the plurality of first acquiring steps; and
a setting step of setting a first display mode, in which two or more images based on two or more image data acquired by two or more of the first acquiring steps are displayed together, in a case where the two or more image data are determined as the display targets, and of setting a second display mode, in which one image based on one image data acquired by one of the first acquiring steps is displayed, in a case where the one image data is determined as the display target,
wherein in a case where a plurality of image data are acquired and formats of the plurality of image data are not the same one format is determined, in the determining step, based on the formats of the plurality of image data, and one or more image data having the determined one format are determined as the display target.

12. The non-transitory computer readable medium according to claim 11, wherein in a case where a plurality of image data are acquired and the formats of the plurality of image data are the same, the plurality of image data are determined, in the determining step, as the display targets.

13. The non-transitory computer readable medium according to claim 11, wherein in a case where three or more image data are acquired, a format of one image data, out of the three or more image data, is different from the formats of all the rest of the image data of the three or more image data, and the formats of all the rest of the image data are the same, the one image data is determined, in the determining step, as the display target.

14. The non-transitory computer readable medium according to claim 11, wherein in a case where a plurality of image data are acquired, formats of the plurality of image data are not the same, and an image data to which predetermined information is added is included in the plurality of image data, the one image data to which the predetermined information is added is determined, in the determining step, as the display target.

15. The non-transitory computer readable medium according to claim 14, wherein the predetermined information is payload information.

16. The non-transitory computer readable medium according to claim 11, wherein in a case where a plurality of image data are acquired, formats of the plurality of image data are not the same, and an image data to which predetermined information is added and an image data having the same format as the format of the image data to which the predetermined information is added are included in the plurality of image data, the one image data to which the predetermined information is added and one or more image data having the same format as the format of the one image data to which the predetermined information is added are determined, in the determining step, as the display targets.

17. The non-transitory computer readable medium according to claim 11, wherein the program further causes the computer to execute a second acquiring step of acquiring format information, which is information regarding a format of an image data, and
wherein in a case where a plurality of image data are acquired and the format information is acquired by the second acquiring step, the display target is determined, in the determining step, on the basis of the format information acquired by the second acquiring step.

18. The non-transitory computer readable medium according to claim 17, wherein in a case where a plurality of image data are acquired and format information regarding a first resolution is acquired in the second acquiring step, the plurality of image data are determined, in the determining step, as the display targets, and
wherein in a case where a plurality of image data are acquired and format information regarding a second resolution, which is lower than the first resolution, is acquired in the second acquiring step, one or more image data having the same format as the format related to the format information, out of the plurality of image data, are determined, in the determining step, as the display target.

19. The non-transitory computer readable medium according to claim 11, wherein the format includes at least one of: resolution, a frame rate and a transmission format.

20. A display control apparatus comprising:
a plurality of receivers each of which is configured to acquire image data;
at least one processor; and
at least one memory storing a program which, when executed by the at least one processor, causes the display control apparatus to:
determine, as a display target, image data acquired by at least one of the receivers on the basis of an acquisition result by the plurality of receivers; and
set a first display mode, in which two or more images based on two or more image data acquired by two or more of the receivers are displayed together, in a case where the two or more image data are determined as the display targets, and set a second display mode, in which one image based on one image data acquired by one of the receivers is displayed, in a case where the one image data is determined as the display target, wherein in a case where a plurality of image data are acquired, it is determined whether the plurality of image data includes a dummy image data or not, and one or more image data which are not the dummy image data are determined as the display target.

21. The display control apparatus according to claim 20, wherein it is determined whether the plurality of image data includes the dummy image data or not, based on formats of the plurality of image data.

22. The display control apparatus according to claim 20, wherein it is determined whether the plurality of image data includes the dummy image data or not, based on added information of the plurality of image data.

23. A non-transitory computer readable medium that stores a program, wherein the program causes a computer to execute steps comprising:

a plurality of first acquiring steps each in which image data is acquired;

a determining step of determining, as a display target, image data acquired by at least one of the first acquiring steps on the basis of an acquisition result by the plurality of first acquiring steps; and a setting step of setting a first display mode, in which two or more images based on two or more image data acquired by two or more of the first acquiring steps are displayed together, in a case where the two or more image data are determined as the display targets, and of setting a second display mode, in which one image based on one image data acquired by one of the first acquiring steps is displayed, in a case where the one image data is determined as the display target, wherein in a case where a plurality of image data are acquired, it is determined, in the determining step, whether the plurality of image data includes a dummy image data or not, and one or more image data which are not the dummy image data are determined as the display target.

24. The non-transitory computer readable medium according to claim 23, wherein in the determining step, it is determined whether the plurality of image data includes the dummy image data or not, based on formats of the plurality of image data.

25. The non-transitory computer readable medium according to claim 23, wherein in the determining step, it is determined whether the plurality of image data includes the dummy image data or not, based on added information of the plurality of image data.

* * * * *